United States Patent
Im et al.

(10) Patent No.: US 12,472,338 B2
(45) Date of Patent: Nov. 18, 2025

(54) MICRONEEDLE ARRAY-BASED ELECTRODE COMPRISING ORGANIC PHOTOVOLTAIC SUBSTANCES AND ARTIFICIAL RETINA DEVICE COMPRISING THE SAME

(71) Applicant: KOREA INSTITUTE OF SCIENCE AND TECHNOLOGY, Seoul (KR)

(72) Inventors: Maesoon Im, Seoul (KR); Hyunsun Song, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 579 days.

(21) Appl. No.: 18/081,936

(22) Filed: Dec. 15, 2022

(65) Prior Publication Data

US 2024/0017047 A1    Jan. 18, 2024

(30) Foreign Application Priority Data

Jul. 15, 2022  (KR) ........................ 10-2022-0087484

(51) Int. Cl.
  *A61M 37/00*  (2006.01)
  *A61N 1/05*  (2006.01)
(52) U.S. Cl.
  CPC ....... *A61M 37/0015* (2013.01); *A61N 1/0543* (2013.01); *A61M 2037/0053* (2013.01)
(58) Field of Classification Search
  CPC ...... A61M 37/0015; A61M 2037/0053; A61N 1/0543
  USPC .......................................................... 604/506
  See application file for complete search history.

(56) References Cited

U.S. PATENT DOCUMENTS

| 2007/0260201 A1* | 11/2007 | Prausnitz ............ A61F 9/0017 604/272 |
| 2014/0066855 A1* | 3/2014 | Luttge ................. B81C 99/0085 604/173 |
| 2020/0411782 A1* | 12/2020 | Zhu ....................... H10K 30/82 |

OTHER PUBLICATIONS

Song, Hyunsun et al. "High Efficiency Organic Photovoltaics Based on Non-Fullerene Acceptors (PCE10:ITIC:Y6) for Retinal Prosthesis." *Materials Research Society (MRS) Spring Meeting.* (2022). pp 1-18.

* cited by examiner

*Primary Examiner* — Phillip A Gray
(74) *Attorney, Agent, or Firm* — NSIP Law (57) ABSTRACT

The present disclosure relates to a microneedle array-based electrode comprising organic photovoltaic substances, and an artificial retina device comprising the same, and the microneedle array-based electrode is coated with, as organic photovoltaic substances, a mixture of PCE10, which exhibits the highest absorbance in infrared rays, and ITIC, thereby exhibiting excellent photovoltaic efficiency and low phototoxicity. Further, since an artificial retina device comprising the electrode can adjust the generation of current only with light without any wire connecting the inside and outside of the eyeball, it is possible to restore nerve signals by stimulating the retina of a patient whose photoreceptor cells are damaged.

13 Claims, 7 Drawing Sheets

MICRONEEDLE ARRAY-BASED ELECTRODE COMPRISING ORGANIC PHOTOVOLTAIC SUBSTANCES AND ARTIFICIAL RETINA DEVICE COMPRISING THE SAME

CROSS-REFERENCE TO RELATED APPLICATION

This application claims the benefit under 35 USC § 119(a) of Korean Patent Application No. 10-2022-0087484, filed on Jul. 15, 2022, in the Korean Intellectual Property Office, the entire disclosure of which is incorporated herein by reference for all purposes.

BACKGROUND

1. Field

The following description relates to a microneedle array-based electrode comprising organic photovoltaic substances, and an artificial retina device comprising the same.

2. Description of Related Art

The retina is an important nervous tissue that converts external images received through the cornea and lens into electrical signals and transmits them to the brain. The area of the retina is about 6.25 $cm^2$, and there are about 100 million photoreceptor cells in the retina. The photoreceptor cells transmit nerve signals to bipolar cells, and the nerve signals are transmitted to the brain through ganglion cells. The brain interprets minute electrical signals to form images and to recognize objects. The retina is one of the tissues with a lot of blood supply per unit area because it consumes a lot of energy. The by-products of retinal functions and metabolisms must be appropriately removed. When there is an abnormality in the retinal or choroidal vessels, various diseases occur in the retina.

Retinitis pigmentosa (RP), one of the retinal diseases, is a progressive retinal degenerative disease caused by dysfunction of photoreceptor cells distributed in the retina, and retinal photoreceptor cells and retinal pigment epithelium are the main lesions. The prevalence of retinitis pigmentosa is being reported to be 1 in 3500 to 4000 people worldwide. Age-related macular degeneration (AMD), which is one of the other retinal diseases, is one of the three major blindness diseases. The prevalence of AMD is significantly increasing in recent years due to the rapid aging of the population. It is reported that, in patients with AMD, visual acuity often deteriorates in a relatively short period of time compared to patients with low vision due to RP, and in the patients with AMD, the real-life disability degree and psychological atrophy due to the eyes are greater than those of other diseases.

Various treatments such as gene therapy, stem cells, and drug therapy are being tried in recent years in order to treat blind patients. However, most of the patients with blindness have an already damaged retinal photoreceptor cell layer so that most of the period for enabling gene therapy or drug treatment has passed. However, since only the photoreceptor cell layer, which is the outer layer of the retina, is damaged in the case of retinal diseases such as RP and AMD, there is a possibility of restoring vision if the function of the photoreceptor cell layer is replaced. Therefore, an artificial retina device that recovers vision by electrically stimulating the remaining retinal cells of patients who have lost sight due to damage to the outer visual cell layer of the retina is a trend that is partially commercialized as a new treatment.

Although the configuration of the artificial retina device is slightly different for each manufacturer, it is common that microelectrode arrays (MEAs) for electrically stimulating the retina are essentially included.

Currently, commercialized artificial retina devices require a wire connection for electrical current and data transmission. However, connecting a wire from inside to outside of the eyeball may lead to complications for surgery and side effects after implantation.

According to previous studies, in the existing research on photovoltaic devices for electrical stimulation, most of the electrodes have a flat structure that is difficult to efficiently stimulate cells which are present deep in the retinal tissue by delivering stimulation only to the surface of the retina. The wavelength band of light irradiated to operate the photovoltaic devices is 600 nm or less, which is the absorbance wavelength band of an organic photovoltaic substance, and there is a high possibility of phototoxicity to the living body. In addition, it was reported that the photovoltaic efficiency of the organic photovoltaic substance used in the previous study was also low.

Accordingly, the present inventors confirmed that the microneedle array-based electrode comprising a mixture of PCE10, ITIC, and Y6 had excellent photovoltaic efficiency and repeated use efficiency, and completed the present disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example embodiments provide a microneedle array-based electrode.

Further, example embodiments provide a method for manufacturing the microneedle array-based electrode.

Further, example embodiments provide an artificial retina device comprising the microneedle array-based electrode.

However, the technical problems to be achieved by the present disclosure are not limited to the above-mentioned problems, and other problems not mentioned will be clearly understood by those skilled in the art from the following description.

According to an aspect, in order to solve the foregoing problems, there is provided a microneedle array-based electrode comprising: a microneedle array structure in which a plurality of microneedles are disposed to be spaced apart, an insulator layer is filled between the microneedles, and electrode pillars are included at both ends thereof; and a coating layer formed by mixing organic photovoltaic substances including PCE10 (PTB7-Th) and ITIC on a flat surface of the microneedle array structure.

As one example embodiment of the present disclosure, the organic photovoltaic substances may further include Y6 (BTP-4F).

As another example embodiment of the present disclosure, the coating layer may be formed by mixing 25 to 50 parts by weight of PCE10 and 50 to 75 parts by weight of ITIC.

As another example embodiment of the present disclosure, the coating layer may be formed by mixing 25 to 45 parts by weight of PCE10, 50 to 70 parts by weight of ITIC, and 1 to 10 parts by weight of Y6, and may be formed by preferably mixing 40 parts by weight of PCE10, 57 parts by weight of ITIC, and 3 parts by weight of Y6 in chlorobenzene for 12 hours or more, and spin coating the mixture at 3,000 rpm for 45 seconds.

As another example embodiment of the present disclosure, the microneedle array structure may be formed by etching a silicon (Si) wafer.

As another example embodiment of the present disclosure, the insulator layer may be formed through a glass reflow technique. That is, the insulator layer may be a glass layer.

As another example embodiment of the present disclosure, the coating layer may further include any one or more counter electrodes selected from the group consisting of Ti, Al, Ag, and combinations thereof, and the like, but are not limited thereto. Preferably, a Ti electrode with the highest biocompatibility may be added.

As another example embodiment of the present disclosure, the coating layer may further include polydimethylsiloxane (PDMS), and the like, but are not limited thereto.

In another example embodiment of the present disclosure, the electrode may be one in which end portions of the microneedles are coated with any one or more metals selected from the group consisting of iridium oxide ($IrO_x$), platinum (Pt) black, titanium nitride (TiN), and a combination thereof, and the like, but are not limited thereto, and this may increase the conductivity of the electrode.

As another example embodiment of the present disclosure, the electrode may be one in which the microneedle array structure is coated with any one or more insulating materials selected from the group consisting of parylene, PDMS, polyimide, and combinations thereof.

As another example embodiment of the present disclosure, the microneedle may have a needle's height of 10 to 300 μm. If the needle's height is higher than this, it penetrates through the retinal cells, and if it is lower than this, it stimulates the ganglion cell on the surface, or there is little difference with the two-dimensional electrode. Since the present disclosure intends to stimulate cells with a depth of about 180 μm, the microneedle according to the present disclosure may preferably have a height of 160 μm.

As another example embodiment of the present disclosure, the microneedle may have a total height obtained by adding the needle and the portion in contact with the insulator layer of 50 to 1,000 μm, preferably 410 μm.

As another example embodiment of the present disclosure, the microneedle may have a needle's base diameter of 5 to 200 μm, preferably 30 μm. If the diameter of the needle is larger than this, it not only causes physical damage to the cells, but it is also difficult to stimulate only a local range of the cells. If it is smaller than this, the needle is more likely to break when it penetrates the retina.

As another example embodiment of the present disclosure, the microneedle array structure may be one in which the plurality of microneedles is disposed to be constantly spaced apart at a pitch of 50 to 500 μm, preferably 50 μm. If the pitch between the microneedles is wider than this, the artificial visual resolution through retinal stimulation is lowered. If it is narrower than this, the range of cells stimulated by each electrode overlaps, making stimulation for each arbitrary part impossible, and when inserted, a lot of retinal tissues may be destroyed.

Figure 3:
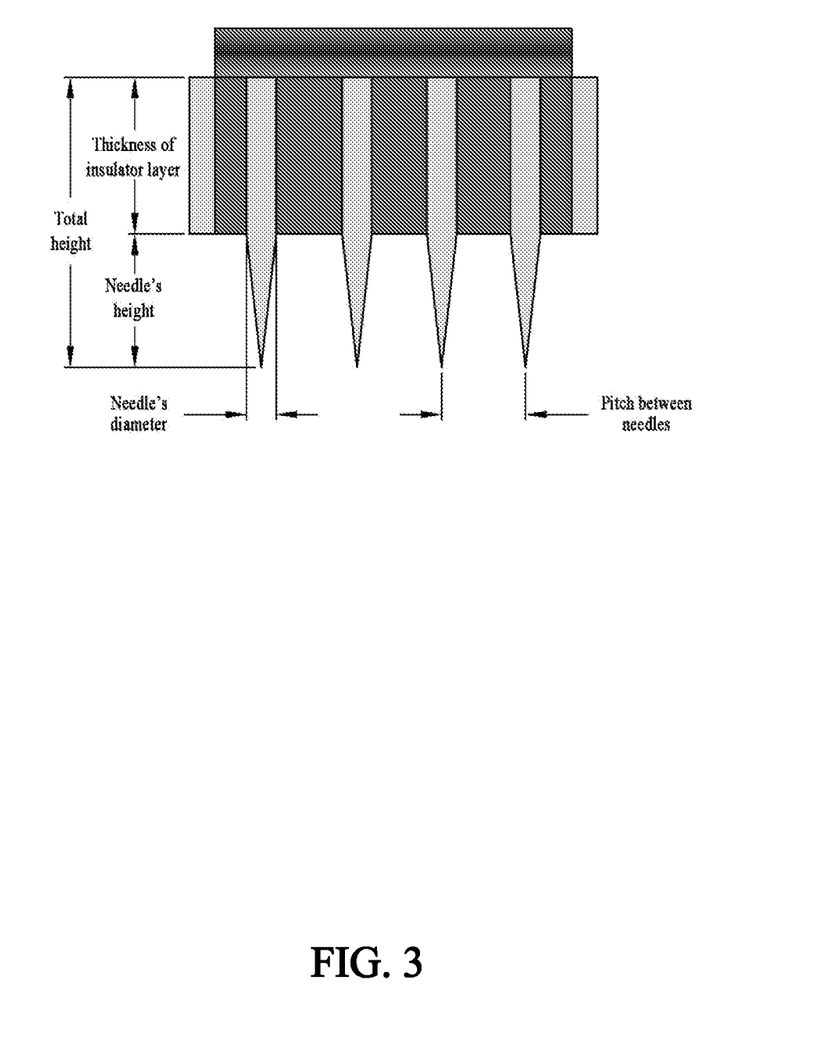
FIG. 3 shows the height, diameter, thickness, and the like of the microneedle array-based electrode according to one example embodiment of the present disclosure.

As another example embodiment of the present disclosure, the microneedle array structure may have a thickness of the insulator layer of 10 to 300 μm, preferably 100 μm. If the thickness becomes thicker than this, it is unfavorable to retinal contact, and there may be an impact that the length of the microneedle is shortened. If it becomes thinner than this, it is easily broken during manufacturing and is difficult to handle (FIG. 3).

According to another aspect, there is provided a method for manufacturing a microneedle array-based electrode, the method comprising the following steps of:

(1) patterning and etching a wafer;
(2) performing glass reflow on the etched wafer;
(3) performing chemical mechanical polishing (CMP) on the wafer including the glass layer;
(4) manufacturing a microneedle array structure by backside-aligning the polished wafer with a photomask and patterning and etching the backside-aligned polished wafer; and
(5) manufacturing a microneedle array-based electrode by coating the flat surface of the manufactured microneedle array structure with a mixture of organic photovoltaic substances including PCE10 and ITIC.

As one example embodiment of the present disclosure, the organic photovoltaic substances may further include Y6 (BTP-4F).

As another example embodiment of the present disclosure, the step (1) may be one of patterning a silicon wafer by photolithography, and performing anisotropic etching by a deep reactive ion etching (DRIE) process.

As another example embodiment of the present disclosure, the step (2) may be performing glass reflow after anodic bonding glass to the etched wafer.

As another example embodiment of the present disclosure, the step (4) may be one of primarily performing anisotropic etching by a deep reactive ion etching process, and then secondarily performing isotropic etching.

As another example embodiment of the present disclosure, the step (5) may be one of bonding a wafer before processing (bare wafer) and a microneedle array structure so that the microneedles go downward, and then coating the microneedle array structure with the mixture.

As another example embodiment of the present disclosure, the step (5) may be one of coating the microneedle array structure with the mixture, and then further coating Ti, Al, Ag, or polydimethylsiloxane (PDMS) on the microneedle array structure, and may be preferably coating a mixture of PCE10, ITIC, and Y6, Ti, and PDMS in order on the microneedle array structure.

As another example embodiment of the present disclosure, the step (5) may be one of coating the microneedle array structure with the mixture, and then further coating the end portions of the microneedles with any one or more metals selected from the group consisting of iridium oxide ($IrO_x$), platinum (Pt) black, and a combination thereof.

As another example embodiment of the present disclosure, the step (5) may be one of coating the microneedle array structure with the mixture, and then further coating the microneedle array structure with any one or more insulating materials selected from the group consisting of parylene, PDMS, polyimide, and combinations thereof.

According to another aspect, there is provided an artificial retina device comprising the microneedle array-based electrode.

As one example embodiment of the present disclosure, the artificial retina device may be one which generates a current from light to stimulate retinal nerve cells, preferably the bipolar cell layer.

According to example embodiments, the microneedle array-based electrode and the artificial retina device comprising the same adjust current generation only with light without a wire connection connecting the inside and outside of the eyeball and stimulate the retina of a patient whose photoreceptor cells are damaged to enable nerve signals to be restored.

According to example embodiments, the microneedle array-based electrode and the artificial retina device comprising the same exhibit excellent photovoltaic efficiency by comprising a mixture of PCE10 and ITIC as organic photovoltaic substances.

According to example embodiments, the microneedle array-based electrode and the artificial retina device comprising the same use organic photovoltaic substances exhibiting the highest absorbance in infrared rays, and thus have a low risk of phototoxicity in vivo.

According to example embodiments, the microneedle array-based electrode and the artificial retina device comprising the same enable the microneedles to be used as an integrated device by separating the microneedles as an insulator layer such that each of the microneedles operates as an independent electrode.

According to example embodiments, the effects of the microneedle array-based electrode and the artificial retina device comprising the same are not limited to those mentioned above, and other effects not mentioned will be able to be clearly understood by those skilled in the art from the description below.

Other features and aspects will be apparent from the following detailed description, the drawings, and the claims.

BRIEF DESCRIPTION OF THE DRAWINGS

FIGS. 4A and 4B show an artificial retina device comprising the microneedle array-based electrode according to one example embodiment of the present disclosure.

FIGS. 5A, 5B, and 5C show photovoltaic efficiencies when a mixture of PCE10 and ITIC was used as the organic photovoltaic substance (Example 1), and when a mixture of PCE10, ITIC, and Y6 were used as the organic photovoltaic substance (Example 2) compared to when PCE10 alone was used as an organic photovoltaic substance (Comparative Example).

FIGS. 7A, 7B, and 7C show the photovoltaic performance when a mixture of PCE10, ITIC, and Y6 was used as the organic photovoltaic substance (Example) compared to when PCE10 alone was used as an organic photovoltaic substance (Comparative Example).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, embodiments will be described in detail with reference to the accompanying drawings. However, since various changes may be made to the embodiments, the scope of rights of the patent application is not restricted or limited by these embodiments. It should be understood that all modifications, equivalents and substitutes for the embodiments are included in the scope of the rights.

The terms used in the embodiments are used for the purpose of description only, and should not be construed as an intention to limit the present disclosure. The singular expression includes the plural expression unless the context clearly dictates otherwise. In the present specification, it should be understood that a term such as "comprise", "have", or the like is intended to designate that a feature, a number, a step, an operation, a component, a part, or a combination thereof described in the specification exists, but it does not preclude the possibility of existence or addition of one or more other features, numbers, steps, operations, components, parts, or combinations thereof.

Unless defined otherwise, all terms used herein, including technical or scientific terms, have the same meaning as those commonly understood by one of ordinary skill in the art to which the embodiments belong. Terms such as those defined in a commonly used dictionary should be interpreted as having a meaning consistent with the meaning in the context of the related art, and should not be interpreted in an ideal or excessively formal meaning unless explicitly defined in the present application.

Further, in the description with reference to the accompanying drawings, the same elements are assigned the same reference numerals regardless of the reference numerals, and the overlapping description thereof will be omitted. In the description of the embodiments, if it is determined that a detailed description of a related known technology may unnecessarily obscure the gist of the embodiments, the detailed description will be omitted.

Further, in describing constituent elements of the embodiments, terms such as first, second, A, B, (a), (b), etc. may be used. These terms are only for distinguishing the constituent elements from other constituent elements, and essences, orders, sequences, or the like of the corresponding constituent elements are not limited by the terms. When it is described that a constituent element is "linked", "coupled" or "connected" to other constituent element, the constituent element may be directly linked or connected to the other constituent element, but it should be understood that another constituent element may also be "linked", "coupled" or "connected" between the respective constituent elements.

Constituent elements included in any one embodiment and constituent elements including a common function will be described using the same names in other embodiments. Unless otherwise stated, descriptions described in any one embodiment may also be applied to other embodiments, and detailed descriptions will be omitted within the overlapping range.

Figure 1:
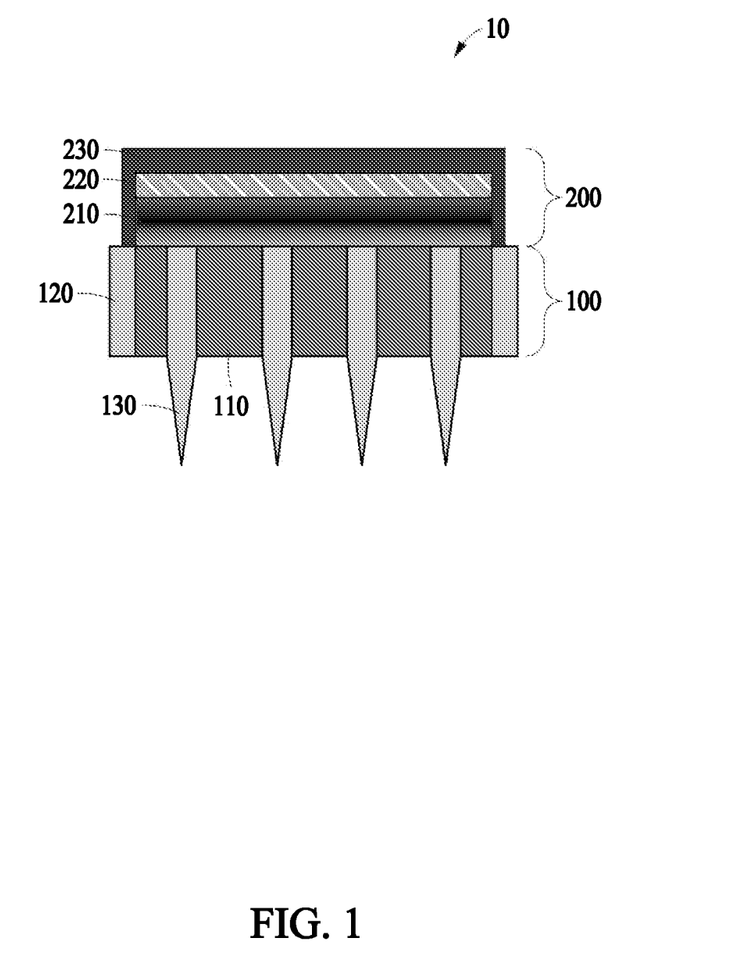
FIG. 1 shows a microneedle array-based electrode according to one example embodiment of the present disclosure.

FIG. 1 is a view showing a microneedle array-based electrode according to one example embodiment of the present disclosure.

Referring to FIG. 1, the microneedle array-based electrode 10 according to one example embodiment may comprise: a microneedle array structure 100; and a coating layer 200, wherein the microneedle array structure may include a plurality of microneedles 130 disposed to be spaced apart, an insulator layer 110 filled between the microneedles, and electrode pillars 120 at both ends thereof. The coating layer may include an organic photovoltaic substance layer 210 formed by mixing organic photovoltaic substances including PCE10 and ITIC, preferably organic photovoltaic substances including PCE10, ITIC, and Y6 on the flat surface of the microneedle array structure. In addition, the coating layer may include a Ti layer 220 as an opposite electrode so that electrons and holes generated from the organic photovoltaic substances are separated from each other and moved efficiently. In addition, it may include a polydimethylsiloxane (PDMS) layer 230 to protect the organic photovoltaic substance layer.

In the present disclosure, "microneedles" refer to microneedles having a size of several hundred micrometers (μm), and the microneedles according to the present disclosure may have a height of 10 to 300 μm, preferably 160 μm, and a diameter of 5 to 200 μm, preferably 30 μm.

In the present disclosure, "insulator layer" refers to a layer made of a material through which current does not flow, and serves to separate the microneedles according to the present disclosure so that the microneedles operate as independent electrodes. According to one embodiment of the present disclosure, the insulator layer may be a glass layer, and may be formed by performing a glass reflow process on a wafer.

In the present disclosure, "organic photovoltaic substances" refer to organic materials that absorb light to generate an electric current, and the electrode according to the present disclosure may use PCE10, ITIC, and Y6 as organic photovoltaic substances.

Figure 6:
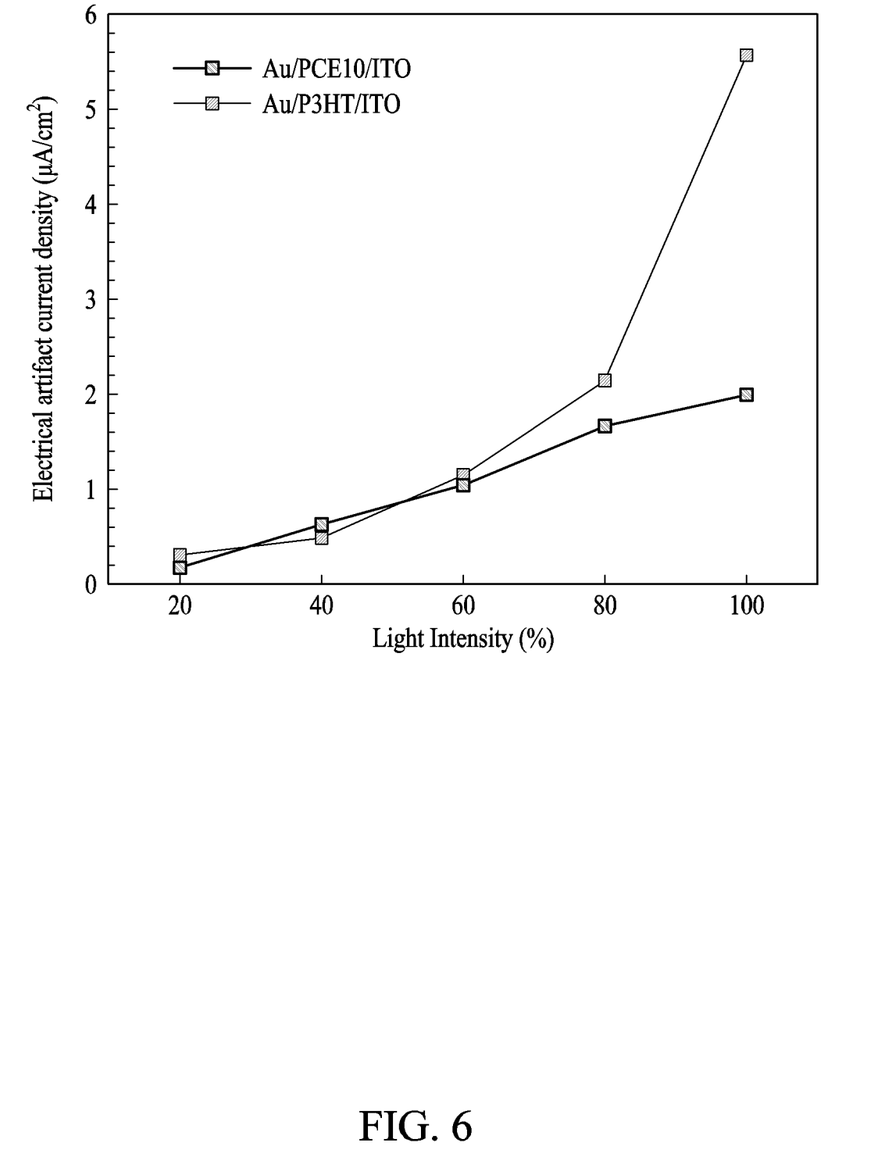
FIG. 6 shows the results of electrical artifacts in order to compare the photovoltaic efficiencies when using PCE10 compared to P3HT, which is conventionally used as an organic photovoltaic substance.

"PCE10" is a structure of [Chemical Formula 1] below, also called poly[4,8-bis(5-(2-ethylhexyl)thiophen-2-yl)benzo[1,2-b;4,5-b']dithiophene-2,6-diyl-alt-(4-(2-ethylhexyl)-3-fluorothieno[3,4-b]thiophene-)-2-carboxylate-2-6-diyl)] or PTB7-Th, and exhibits the maximum absorbance at a wavelength of 650 to 850, preferably 698 nm. It was confirmed that the photovoltaic efficiency of PCE10 was two times or more high compared to that of poly(3-hexylthiophene) (P3HT), which is frequently used as a photovoltaic substance (FIG. 6).

[Chemical Formula 1]

"ITIC" is a structure of [Chemical Formula 2] below, also called 3,9-bis(2-methylene-(3-(1,1-dicyanomethylene)-indanone))-5,5,11,11-tetrakis(4-hexylphenyl)-dithieno[2,3-d:2',3'-d']s-indaceno[1,2-b:5,6-b']dithiophene, and exhibits the maximum absorbance at a wavelength of 600 to 800 nm.

[Chemical Formula 2]

"Y6" is a structure of [Chemical Formula 3] below, also called 2,2'-((2Z,2'Z)-((12,13-bis(2-ethylhexyl)-3,9-diundecyl-12,13-dihydro-[1,2,5]thiadiazolo[3,4-e]thieno[2",3": 4',5']thieno[2',3':4,5]pyrrolo[3,2-g]thieno[2',3':4,5]thieno[3,2-b]indole-2,10-diyl)bis(methanylylidene))bis(5,6-difluoro-3-oxo-2,3-dihydro-1H-indene-2,1-diylidene)) dimalononitrile or BTP-4F, and exhibits the maximum absorbance at a wavelength of 700 to 900 nm.

[Chemical Formula 3]

Since the organic photovoltaic substances according to the present disclosure exhibit the highest absorbance in infrared rays, the microneedle array-based electrode according to the present disclosure comprising the same has a low risk of phototoxicity in vivo.

The microneedle array-based electrode according to one embodiment of the present disclosure may contain 25 to 50 parts by weight of PCE10 and 50 to 75 parts by weight of ITIC.

The microneedle array-based electrode according to one embodiment of the present disclosure may comprise as a coating layer 200 an organic photovoltaic substance layer 210 formed by mixing 25 to 45 parts by weight of PCE10, 50 to 70 parts by weight of ITIC, and 1 to 10 parts by weight of Y6, preferably 40 parts by weight of PCE10, 57 parts by weight of ITIC, and 3 parts by weight of Y6 in chlorobenzene for 12 hours or more, and then spin-coating the mixture at 3,000 rpm for 45 seconds. The specific composition is shown in Table 1 below.

TABLE 1

| PCE10:ITIC:Y6 | 22.5 mg/ml | 100% |
|---|---|---|
| PCE10 | 8 mg | 40% |
| ITIC | 11.4 mg | 57% |
| Y6 | 0.6 mg | 3% |
| Chlorobenzene | 1 ml | solvent |

Figure 2:
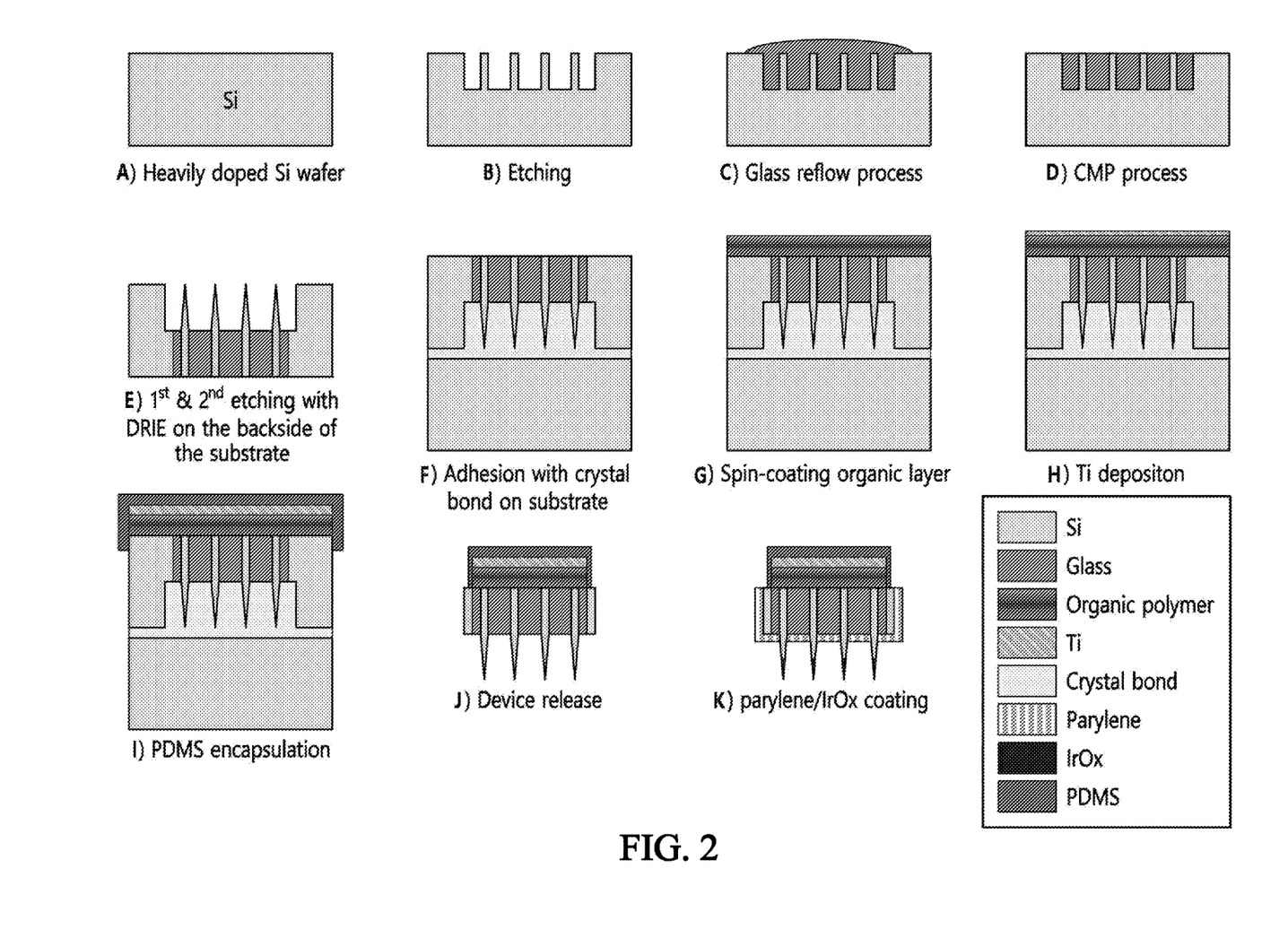
FIG. 2 schematizes a method for manufacturing the microneedle array-based electrode according to one example embodiment of the present disclosure.

FIG. 2 is a view showing a method for manufacturing the microneedle array-based electrode according to one example embodiment of the present disclosure.

The electrode manufacturing method according to the present disclosure comprises the steps of: (1) patterning and etching a wafer; (2) performing glass reflow on the etched wafer; (3) chemical mechanical polishing (CMP) of the wafer including the glass; (4) manufacturing a microneedle array structure by backside-aligning the polished wafer and etching the backside-aligned polished wafer with a photomask; and (5) manufacturing a microneedle array-based electrode by coating the flat surface of the manufactured microneedle array structure with a mixture of PCE10, ITIC, and Y6.

Hereinafter, a method for manufacturing an electrode according to one embodiment of the present disclosure will be sequentially described.

(1) First, a silicon (Si) wafer heavily doped to 525 μm is prepared ((A) of FIG. 2). The silicon wafer is patterned by photolithography, and anisotropic etching is performed by a deep reactive ion etching (DRIE) process ((B) of FIG. 2).

(2) After anodic bonding of glass to the etched wafer, glass reflow is performed to form an insulator layer 110 ((C) of FIG. 2).

(3) The insulator layer, i.e., the wafer including the glass layer, is subjected to chemical mechanical polishing (CMP) to form electrode pillars 120 ((D) of FIG. 2).

(4) The polished wafer is backside-aligned and patterned using a photomask, primarily subjected to anisotropic etching by the deep reactive ion etching process, and then secondarily subjected to isotropic etching to manufacture a microneedle array structure 100 including a plurality of microneedles 130 disposed to be spaced apart ((E) of FIG. 2).

(5) The manufactured microneedle array structure is bonded to a wafer before processing (bare wafer) so that the microneedles go downward using a crystal bond, a photoresist, or the like ((F) of FIG. 2). A coating layer 200 is formed by spin-coating the flat surface of the microneedle array structure with a mixture of PCE10, ITIC, and Y6 ((G) of FIG. 2). Ti is additionally deposited on the coating layer ((H) of FIG. 2). The coating layer is protected by additionally treating it with PDMS ((I) of FIG. 2). A microneedle array-based electrode is obtained from the wafer before processing ((J) of FIG. 2). In order to increase conductivity, the end portions of the microneedles are coated with iridium oxide ($IrO_x$), and the microneedle array-based electrode except for the coating layer, that is, the microneedle array structure, is coated with an insulating film such as parylene or the like ((K) of FIG. 2).

Figure 4A:
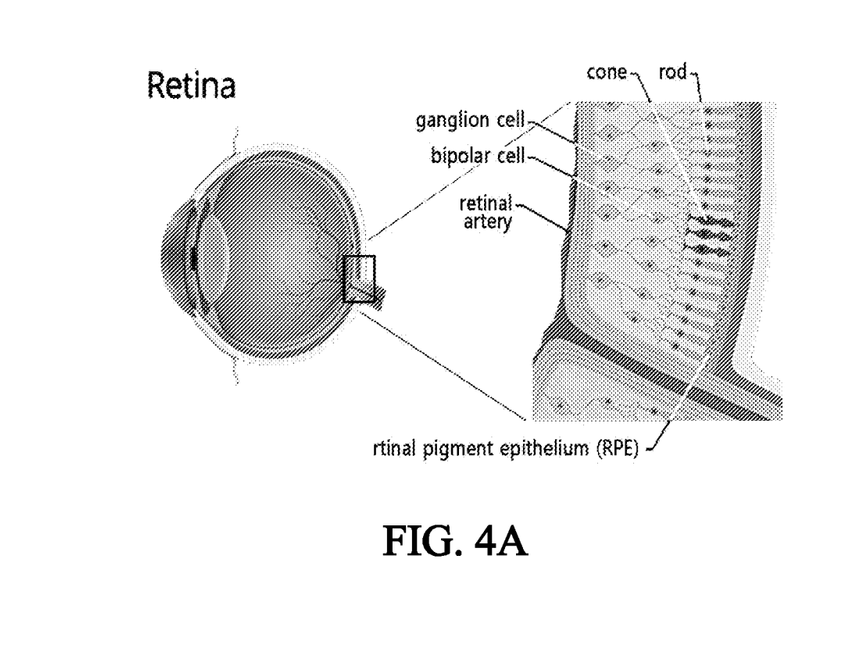
FIG. 4A shows the structure of the retina including a photoreceptor cell layer, a bipolar cell layer, and a ganglion cell layer.
Figure 4B:
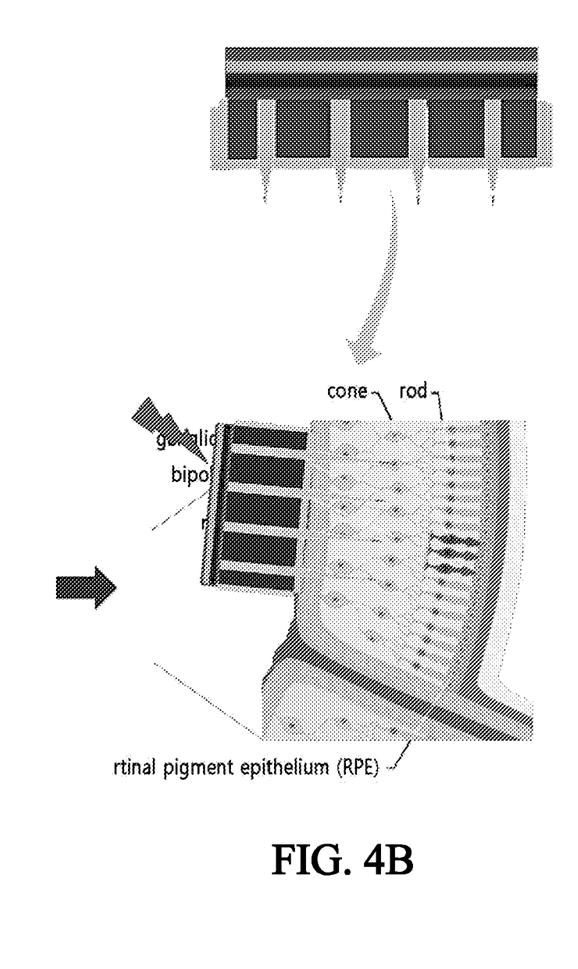
FIG. 4B shows the insertion position within the retina of the electrode according to the present disclosure.
Figure 5A:
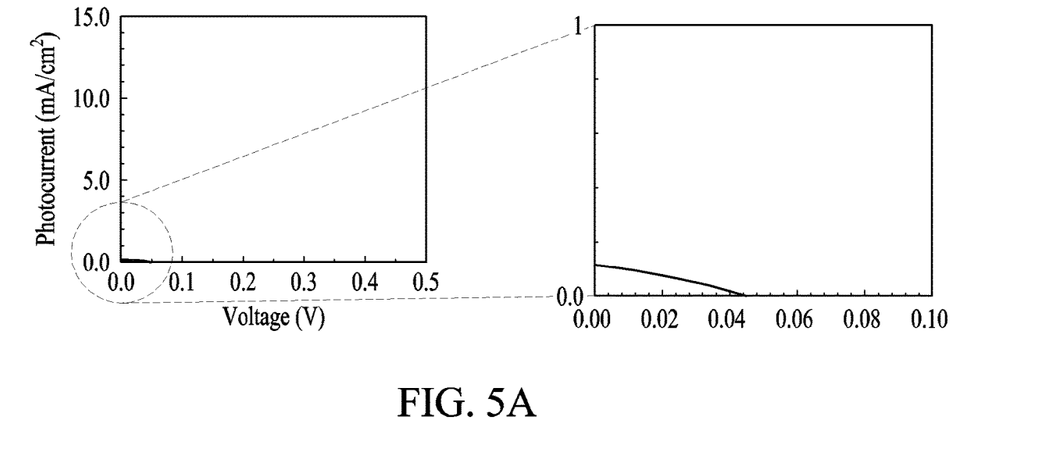
FIG. 5A shows photocurrent and photovoltage of Comparative Example.
Figure 5B:
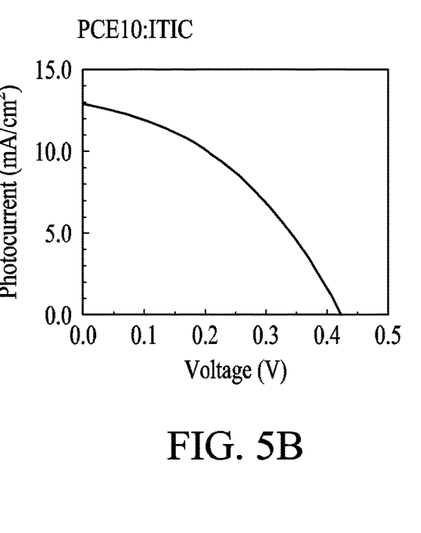
FIG. 5B shows photocurrent and photovoltage of Example 1.
Figure 5C:
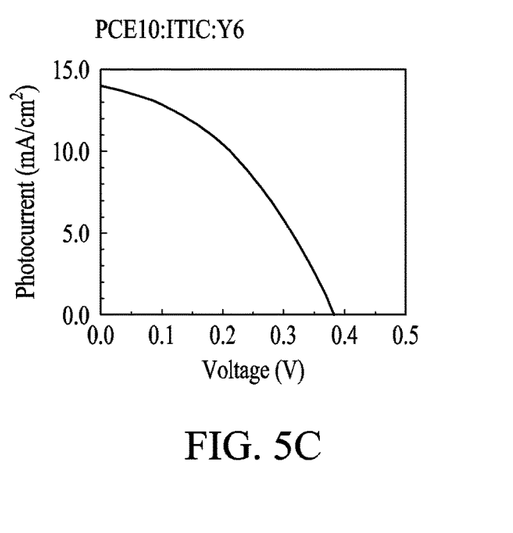
FIG. 5C shows photocurrent and photovoltage of Example 2.

FIGS. 4A and 4B are an exemplary view showing the insertion position in the retina of the microneedle array-based electrode according to one example embodiment of the present disclosure.

In the present disclosure, the "retina" includes a photoreceptor cell layer, a bipolar cell layer, and a ganglion cell layer, and the microneedle array-based electrode according to the present disclosure may restore eyesight by stimulating retinal nerve cells in response to external visual information projected onto the retina. Therefore, it can be utilized in treating patients whose photoreceptor cell layer, which is the outer visual cell layer of the retina, is damaged.

Specifically, the artificial retina device comprising the microneedle array-based electrode according to one embodiment of the present disclosure may be inserted into the top of the retina in the eye (epiretinal implant), inserted into the retina or the bottom of the retina (subretinal implant), or inserted into the top of the choroid (suprachoroidal implant), and may stimulate the bipolar cell layer, which is optic nerve cells in the limited region, by the current generated in the region receiving light, preferably infrared rays, and the nerve signal generated by the cells receiving the electrical stimulation is transmitted to the brain like a normal person's visual circuit and can restore sight.

EXPERIMENTAL EXAMPLE 1. RESULTS OF MEASURING PHOTOVOLTAIC DEVICE EFFICIENCIES ACCORDING TO TYPES OF ORGANIC PHOTOVOLTAIC SUBSTANCES

Direct contact I-V measurement equipment was used in order to compare the photovoltaic conversion efficiencies of microneedle array-based electrodes according to the types of organic photovoltaic substances. This is a technique for measuring the current flowing directly through the electrode, and after irradiating light of 100 mW/cm$^2$ to the electrode manufactured according to one embodiment of the present disclosure, an I-V curve was obtained. The organic photovoltaic substances used during manufacturing of each electrode are shown in Table 2 below.

TABLE 2

| | Number of organic photovoltaic substances | Types of organic photovoltaic substances | Ratio | photocurrent (mA/cm$^2$) | Photovoltage (V) |
|---|---|---|---|---|---|
| Comparative Example | 1 | PCE10 | | 0.117 | 0.045 |
| Example 1 | 2 | PCE10:ITIC | 1:1.5 | 12.938 | 0.423 |
| Example 2 | 3 | PCE10:ITIC:Y6 | 1:1.425:0.15 | 14.045 | 0.383 |

As a result, both photocurrent and photovoltage increased when two or more organic photovoltaic substances were mixed compared to a single substance. Particularly, the mixture of PCE10 and ITIC was measured to have a 9.4 times higher photovoltage than that of the single substance, and the mixture of PCE10, ITIC, and Y6 was measured to have a photocurrent about 120 times higher than that of the single substance and about 1.1 times higher than that of the mixture of PCE10 and ITIC.

That is, it was confirmed that the microneedle array-based electrode according to the present disclosure has excellent photovoltaic efficiency by using a mixture of two or more organic photovoltaic substances (PCE10, ITIC, etc.).

EXPERIMENTAL EXAMPLE 2. PATCH CLAMPING RESULTS ACCORDING TO TYPES OF ORGANIC PHOTOVOLTAIC SUBSTANCES

The patch clamping technique was performed in order to measure neural signals transmitted to the cells of the microneedle array-based electrode according to the types of organic photovoltaic substances. This is a technique to evaluate the photovoltaic performance by creating a similar environment in preparation for the device comprising the electrode to operate in the eyeball.

Figure 7A:
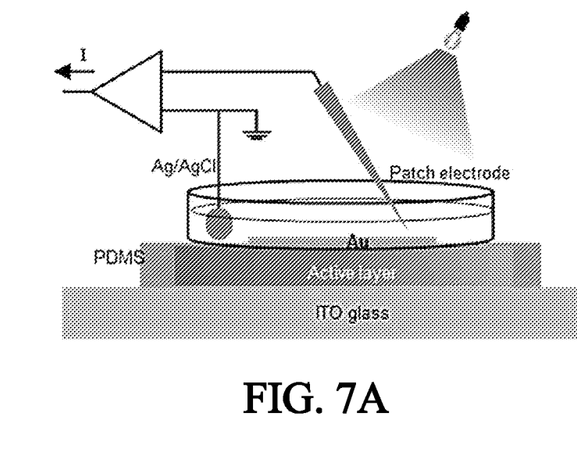
FIG. 7A shows a patch clamping technique.
Figure 7B:
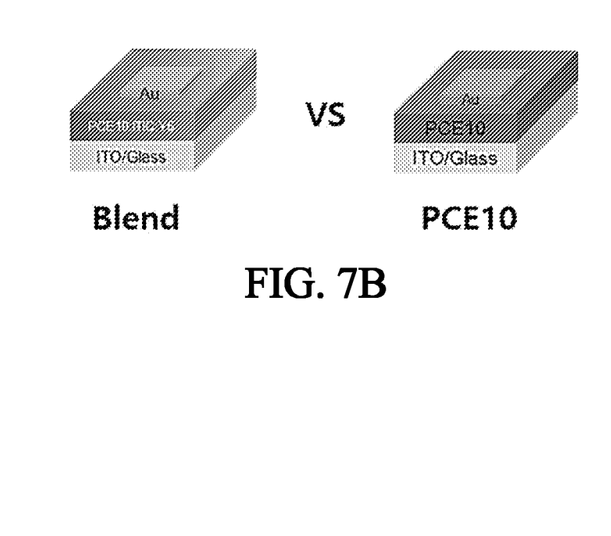
FIG. 7B shows Example and Comparative Example for applying the technique.

First, an organic photovoltaic substance was put on ITO/glass and a gold (Au) electrode was laid to fabricate a device sample (FIG. 7B). The remaining part except for a part of the gold electrode was covered with PDMS. A water tank filled with Ames' medium was formed on the device, and the patch electrode was brought as close as possible to a distance of about 10 µm on the gold electrode of the exposed device. At this time, the electrode was allowed to approach to the device to such a degree that the electrode did not contact the device so as not to break the pipette surrounding the electrode. Thereafter, while irradiating light, the device measured the current generated in the water tank in response to light (FIG. 7A).

As a result of comparing the photovoltaic efficiency of PCE10 used as a photovoltaic substance in the present disclosure with that of P3HT, which is frequently used as a conventional photovoltaic substance according to the above-described technique, PCE10 exhibited a value about two times or more higher than that of P3HT (FIG. 6).

Figure 7C:
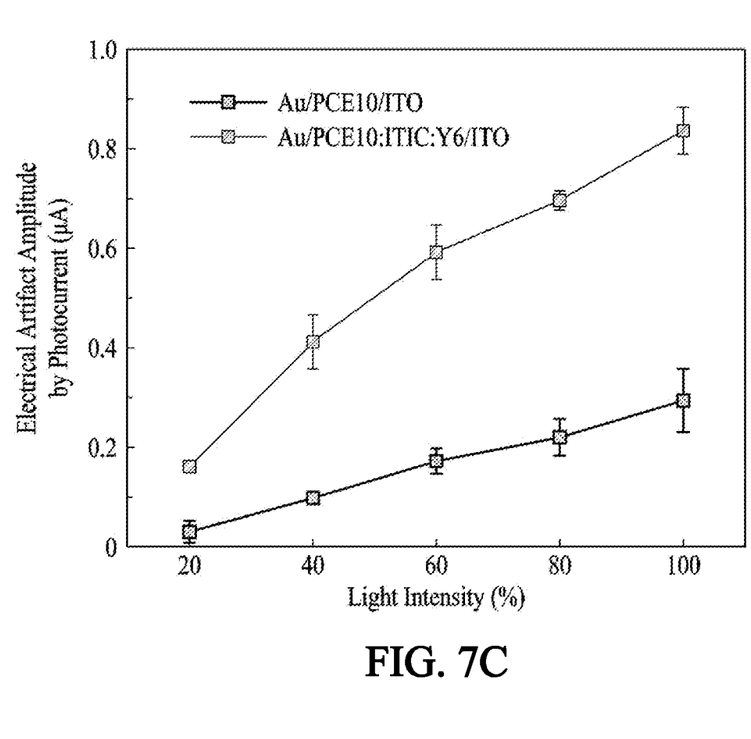
FIG. 7C shows the results of electrical artifacts measured by the patch clamping technique.

Further, as results of comparing the photovoltaic efficiencies of the case of using the mixture of PCE10, ITIC, and Y6 prepared as shown in Table 1 above according to one embodiment of the present disclosure as organic photovoltaic substances (Examples) with the photovoltaic efficiency of the case of using PCE10 alone as a photovoltaic substance (Comparative Example), the Examples exhibited photovoltaic efficiencies 2.5 times or more higher than that of the Comparative Example (FIG. 7C), and this suggests that the microneedle array-based electrode according to the present disclosure gives sufficient electrical stimulation even with little light, and thus it can be used excellently as an artificial retinal device.

Although Examples have been described with reference to the limited drawings as described above, those skilled in the art may apply various technical modifications and variations based on the above description. For example, although the described techniques are performed in an order different from the described method, and/or the constituent elements such as the described system, structure, apparatus, circuit, etc. are coupled or combined in a form different from the described method, or replaced or substituted by other constituent elements or equivalents, appropriate results may be accomplished.

Therefore, other embodiments, other examples, and equivalents to the patent claim scope also belong to the scope of the claims to be described later.

What is claimed is:

1. A microneedle array-based electrode comprising:
   a microneedle array structure in which a plurality of microneedles are disposed to be spaced apart, an insulator layer is filled between the microneedles, and electrode pillars are included at both ends thereof; and
   a coating layer formed by mixing organic photovoltaic substances including PCE10 (PTB7-Th) and ITIC on a flat surface of the microneedle array structure.

2. The microneedle array-based electrode of claim 1, wherein the organic photovoltaic substances further include Y6 (BTP-4F).

3. The microneedle array-based electrode of claim 1, wherein the coating layer is formed by mixing 25 to 50 parts by weight of PCE10 and 50 to 75 parts by weight of ITIC.

4. The microneedle array-based electrode of claim 2, wherein the coating layer is formed by mixing 25 to 40 parts by weight of PCE10, 55 to 70 parts by weight of ITIC, and 1 to 10 parts by weight of Y6.

5. The microneedle array-based electrode of claim 1, wherein the insulator layer is formed through a glass reflow technique.

6. The microneedle array-based electrode of claim 1, wherein the coating layer further includes any one or more selected from the group consisting of Ti, Al, Ag, and combinations thereof.

7. The microneedle array-based electrode of claim 1, wherein the coating layer further includes polymeric insulators such as polydimethylsiloxane (PDMS).

8. The microneedle array-based electrode of claim 1, wherein the electrode is one in which end portions of the microneedles are coated with any one or more metals selected from the group consisting of iridium oxide (IrO$_x$), platinum (Pt) black, titanium nitride (TiN), and a combination thereof.

9. The microneedle array-based electrode of claim 1, wherein the electrode is one in which the microneedle array structure is coated with any one or more insulating materials selected from the group consisting of parylene, PDMS, polyimide, and combinations thereof.

10. The microneedle array-based electrode of claim 1, wherein the microneedle has a needle's height of 10 to 300 μm and a needle's diameter of 1 to 200 μm.

11. The microneedle array-based electrode of claim 1, wherein the microneedle array structure is one in which the plurality of microneedles is disposed to be constantly spaced apart at a pitch of 10 to 1000 μm.

12. An artificial retina device comprising the microneedle array-based electrode of claim 1.

13. The artificial retina device of claim 12, wherein the artificial retina device is one which generates a current from light to stimulate retinal nerve cells.

* * * * *